United States Patent
Ryan et al.

(10) Patent No.: US 11,945,046 B2
(45) Date of Patent: *Apr. 2, 2024

(54) LASER EDGE WELDING OF COPPER SUBSTRATES

(71) Applicant: Ford Global Technologies, LLC, Dearborn, MI (US)

(72) Inventors: Emily Ann Ryan, Allen Park, MI (US); Elizabeth Therese Hetrick, Ann Arbor, MI (US); Arnon Wexler, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 699 days.

This patent is subject to a terminal disclaimer.

(21) Appl. No.: 17/102,809

(22) Filed: Nov. 24, 2020

(65) Prior Publication Data

US 2022/0161361 A1   May 26, 2022

(51) Int. Cl.
| | |
|---|---|
| *B23K 26/26* | (2014.01) |
| *B23K 26/00* | (2014.01) |
| *B23K 26/03* | (2006.01) |
| *B23K 26/035* | (2014.01) |
| *B23K 26/32* | (2014.01) |

(Continued)

(52) U.S. Cl.
CPC .......... *B23K 26/26* (2013.01); *B23K 26/0006* (2013.01); *B23K 26/032* (2013.01); *B23K 26/035* (2015.10); *B23K 26/32* (2013.01); *H02K 15/0421* (2013.01); *B23K 2101/36* (2018.08); *B23K 2103/12* (2018.08); *H02K 2203/09* (2013.01)

(58) Field of Classification Search
CPC .. B23K 26/26; B23K 26/032; B23K 2103/12; B23K 2101/36; H01R 4/021; H01R 4/029
USPC .................................................... 219/121.64
See application file for complete search history.

(56) References Cited

U.S. PATENT DOCUMENTS

| | | |
|---|---|---|
| 10,239,154 B2 | 3/2019 | Ciampolini et al. |
| 2018/0236605 A1* | 8/2018 | Finuf ..................... B23K 26/26 |

(Continued)

FOREIGN PATENT DOCUMENTS

| | | |
|---|---|---|
| CN | 106425103 | 2/2018 |
| JP | 2016112607 | 6/2016 |

OTHER PUBLICATIONS

Vater, et al., Fault Classification and Correction Based on Convolutional Neural Networks Exemplified by Laser Welding of Hairpin Windings, pp. 1-3, 2019 9th International Electric Drives Production Conference publication, IEEE, Feb. 27, 2020.

(Continued)

*Primary Examiner* — Janie M Loeppke
*Assistant Examiner* — Simpson A Chen
(74) *Attorney, Agent, or Firm* — Burris Law, PLLC

(57) ABSTRACT

A method of joining electrical connections together includes evaluating at least one weld joint between at least two substrates, determining mismatch between the at least two substrates, and welding the at least two substrates together with a multi-step welding process. The multi-step welding process includes compensating for mismatch between the at least two substrates by welding on both sides but not overlapping a joint line between the at least two substrates with a first welding step and increasing melt volume and penetration depth of a weld between the at least two substrates with a second welding step.

19 Claims, 6 Drawing Sheets

(51) Int. Cl.
  *B23K 101/36*     (2006.01)
  *B23K 103/12*     (2006.01)
  *H02K 15/04*      (2006.01)

(56) References Cited

U.S. PATENT DOCUMENTS

2021/0053152 A1* 2/2021 Vierstraete ........... B23K 1/0056
2022/0134479 A1* 5/2022 Ryan ................. H01R 43/0221
                                                    219/121.64

OTHER PUBLICATIONS

Mayr, et al., Evaluation of Machine Learning for Quality Monitoring of Laser Welding Using the example of the Contacting of Hairpin Windings, pp. 1-3, 2018 8th International Electric Drives Production Conference publication, IEEE, Mar. 7, 2019.

* cited by examiner

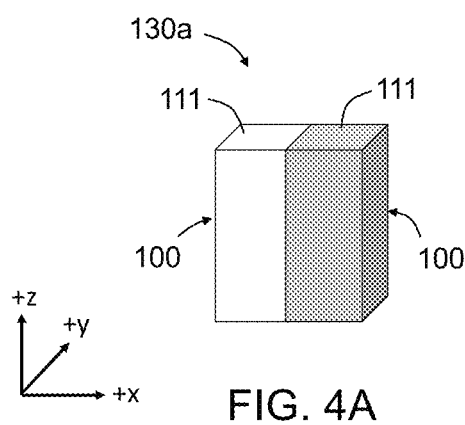
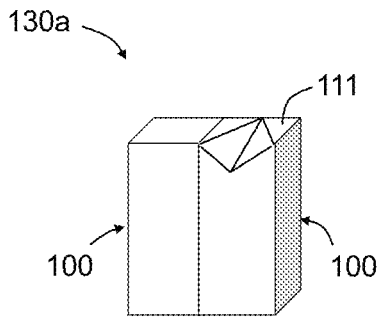
FIG. 4A     FIG. 4B
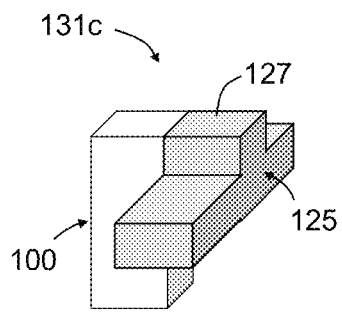
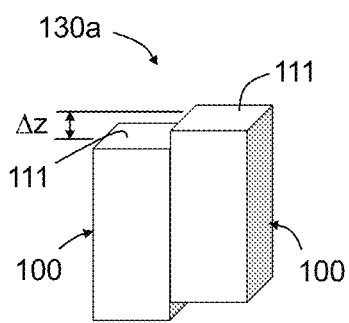
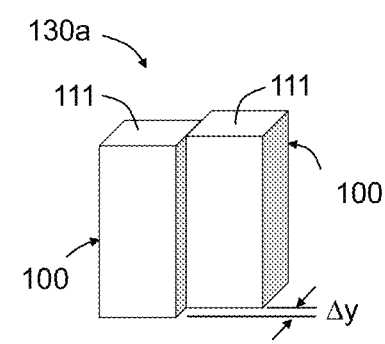
FIG. 4C     FIG. 4D     FIG. 4E
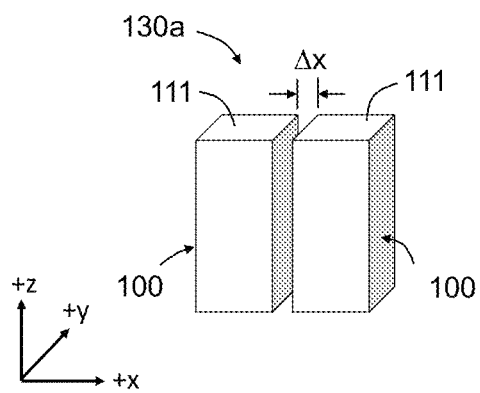
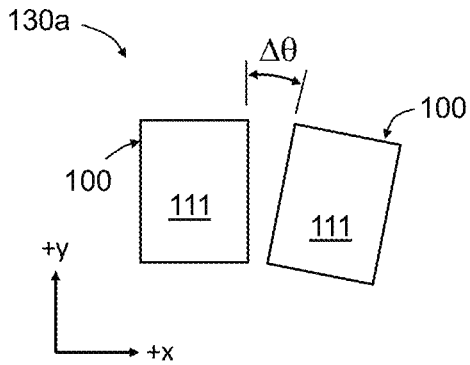
FIG. 4F     FIG. 4G

LASER EDGE WELDING OF COPPER SUBSTRATES

FIELD

The present disclosure relates to welding and particularly laser welding of hairpin wires and tab connectors of electric motor stators.

BACKGROUND

The statements in this section merely provide background information related to the present disclosure and may not constitute prior art.

High performance electric motors have increased conductor packing density and employ a uniform distribution of copper windings to reduce loss during operation, improve NVH, and improve packaging space compared to traditional random wound, round wire windings. Also, uniformly distributed rectangular windings are used to form stator windings that provide such increases in conductor packing density.

Rectangular windings can be formed from individual wire segments that are joined together to create a continuous electrical path. For example, spooled copper wire coated with a protective polymer layer is straightened, cut into segments, and the segments bent into U-shaped sections often referred to as 'hairpin' sections or hairpin wires. The hairpins are de-coated at joining locations (e.g., ends of the hairpins) prior to being fed through slots in a steel stator core and then joined together to form the continuous electrical path, i.e., the stator winding, such that a desired stator winding is provided.

The present disclosure addresses issues related to joining hairpin wires together and other issues related to the manufacture of electric motor stators.

SUMMARY

This section provides a general summary of the disclosure and is not a comprehensive disclosure of its full scope or all of its features.

In one form of the present disclosure a method of joining electrical connections together includes evaluating at least one weld joint between at least two substrates, determining any mismatch between the at least two substrates, and welding the at least two substrates together with a multi-step welding process. The multi-step welding process includes compensating for any mismatch between the at least two substrates by welding on both sides but not overlapping a joint line between the at least two substrates with a first welding step and increasing melt volume and penetration depth of a weld between the at least two substrates with a second welding step.

In some variations of the present disclosure, evaluating the at least one weld joint includes identifying edges and center points of the at least two substrates, and at least one of angular misalignment between the at least two substrates, a gap between the at least two substrates, a vertical offset between the at least two substrates, a lateral offset between the at least two substrates, a difference in reflectivity between the at least two substrates, a difference in geometric shape between the at least two substrates, a difference in chemistry between the at least two substrates In at least one variation, the first welding step includes welding linear weld segments biased towards but not overlapping the joint line between the at least two substrates and the second welding step includes circular or elliptical welding over the joint line between the at least two substrates.

In some variations, the at least two substrates include two rectangular wires butted together, while in other variations the at least two substrates include three rectangular wires butted together. In at least one variation the at least two substrates include a hairpin wire butted against a tab connector and in some variations the at least two substrates include a tab connector butted between two hairpin wires or two hairpin wires butted against a tab connector. Non-limiting examples of a tab connector include a neutral connector, a terminal connector, and a jumper connector, among others.

In some variations, the at least two substrates are vertically misaligned from each other and the first welding step reduces the vertical mismatch before the second welding step.

In at least one variation the at least two substrates include a plurality of hairpin wire connections and welding the at least two substrates together includes welding the plurality of hairpin wire connections together by executing the first welding step and the second welding step on each of the plurality of hairpin wire connections. In such variations the method can further include assembling an electric motor stator via welding the plurality of hairpin wire connections together and the plurality of hairpin wire connections can be laser welded together with a weld travel speed between 100 mm/s and 500 mm/s.

In at least one variation the at least one weld joint between the at least two substrates is evaluated with an electronic vision system. In such variations, the electronic vision system identifies at least one of a position of each of the plurality of hairpin wire connections, a size of each hairpin wire forming each of the plurality of hairpin wire connections, one or more edges of each hairpin wire forming each of the plurality of hairpin wire connections, an angular misalignment between each hairpin wire forming each of the plurality of hairpin wire connections, a gap between each hairpin wire forming each of the plurality of hairpin wire connections, a vertical offset between each hairpin wire forming each of the plurality of hairpin wire connections, a lateral offset between each hairpin wire forming each of the plurality of hairpin wire connections, a difference in reflectivity between each hairpin wire forming each of the plurality of hairpin wire connections, a difference in geometric shape between each hairpin wire forming each of the plurality of hairpin wire connections, and a difference in chemistry between each hairpin wire forming each of the plurality of hairpin wire connections. Also, the electronic vision system can be co-axial to a laser beam welding the at least two substrates together.

In another form of the present disclosure, a method of joining electrical wiring together includes evaluating a weld joint between at least two hairpin wires, determining any mismatch between the at least two hairpin wires, welding at least two weld segments biased towards but not overlapping a joint line between the at least two hairpin wires during a first welding step, and circular or elliptical welding over the joint line between the at least two hairpin wires during a second welding step.

In some variations, the weld joint is evaluated with an electronic vision system and the evaluating includes identifying edges and center points of the at least two hairpin wires, and at least one of an angular misalignment between the at least two hairpin wires, a gap between the at least two hairpin wires, a vertical offset between the at least two hairpin wires, a lateral offset between the at least two hairpin wires, a difference in reflectivity between the at least two hairpin wires, a difference in geometric shape between the at least two hairpin wires, and a difference in chemistry between the at least two hairpin wires.

In at least one variation the method further includes assembling an electric motor stator via welding the ends of a plurality of hairpin wires together with the first welding step and the second welding step.

In still another form of the present disclosure, a method of joining electric motor stator wiring includes evaluating weld joints between hairpin wire connections of a stator winding with an electronic vision system, determining mismatch between each of the hairpin wire connections with the electronic vision system and transmitting at least one mismatch parameter to a laser welding system for each of the hairpin wire connections, laser welding linear weld segments biased towards but not overlapping a joint line between each of the hairpin wire connections during a first welding step and forming a weld across the joint line as a function of the at least one mismatch parameter, and oscillatory welding over the joint line between each of the hairpin wire connections. And in some variations the method further includes assembling an electric motor stator via welding each of the hairpin wire connections together with the first welding step and the second welding step.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a perspective view of one type of mismatch between hairpin wires;

FIG. 4B is a perspective view of another type of mismatch between hairpin wires;

FIG. 4C is a perspective view of one type of mismatch between a hairpin wire and a tab connector;

FIG. 4D is a perspective view of still another type of mismatch between hairpin wires;

FIG. 4E is a perspective view of yet another type of mismatch between hairpin wires;

FIG. 4F is a perspective view of still yet another type of mismatch between hairpin wires;

FIG. 4G is a top view of another type of mismatch between hairpin wires;

Figure 1:
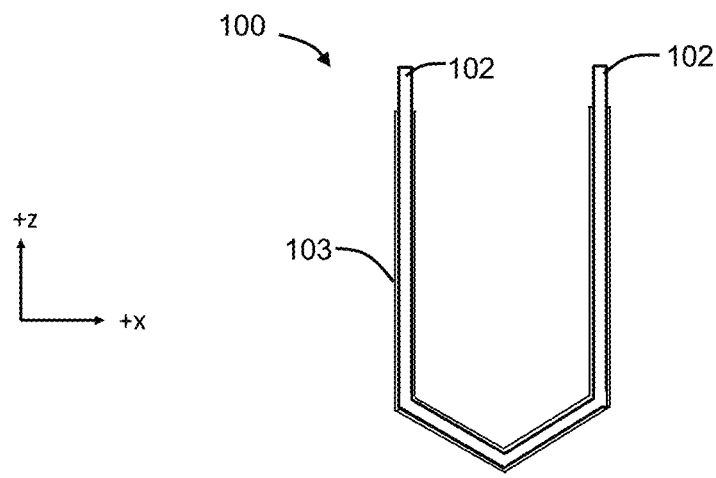
FIG. 1 shows an electrical wire in the form of a hairpin wire segment used for the manufacture of electric motor stator windings according the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
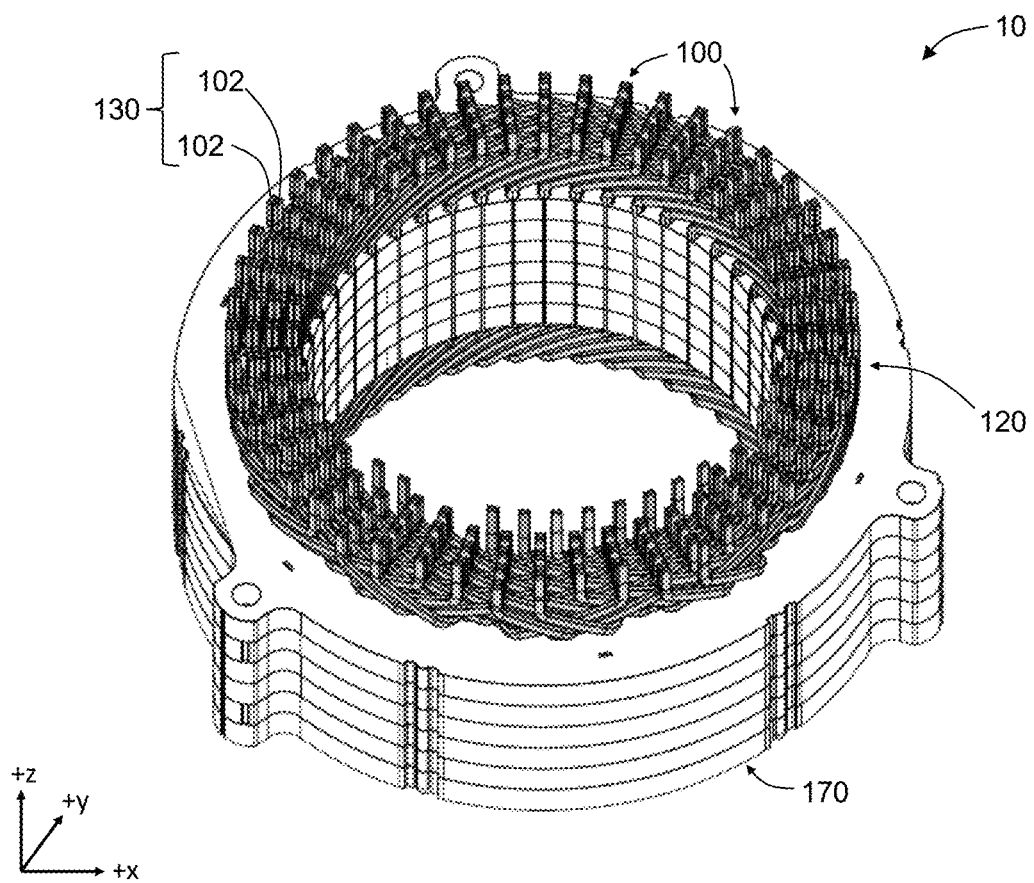
FIG. 2 is a perspective view of a plurality of hairpin wire segments before being welded together to form a stator winding according the teachings of the present disclosure.

Referring to FIGS. 1 and 2, a hairpin wire segment 100 (referred to herein simply as "hairpin wire" or "hairpin wires") is shown in FIG. 1 and an electric motor stator 10 (referred to herein simply as "stator 10") is shown in FIG. 2. The stator 10 includes a stator winding 120 and a stator core 170. The stator winding 120 is formed from a plurality of hairpin wires 100 electrically connected (e.g., welded) to each other (shown without welds in FIG. 2) and tab connectors 125 (e.g., see FIG. 3C). The hairpin wires 100 and tab connectors 125 are made from copper or a copper alloy and the stator core 170 is made from a metal or alloy such as steel. Each of the hairpin wires 100 is bent or formed in a desired shape after insertion into and through the stator core 170 and have a protective enamel coating 103 (e.g., a multi-layer PI, polyester, PAI or PEEK coating) to electrically insulate the hairpin wires 100 from each other and from the stator core 170. Also, the protective enamel coating 103 is removed from or not present at ends 102 of the hairpin wires 100 and hairpin wire connections 130 or hairpin wire-tab connector connections (not shown) are formed to provide a desired stator winding 120 for an electric motor. While the hairpin wires 100 shown in FIG. 1 are rectangular hairpin wires 100 (i.e., have a rectangular cross-section, e.g., in the x-y plane in FIG. 1), it should be understood that hairpin wires with other cross-sectional shapes are included within the scope of the present disclosure.

Figure 3A:
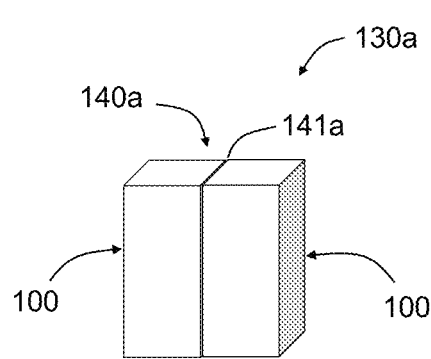
FIG. 3A is a perspective view of a hairpin wire connection according to one variation of the present disclosure.
Figure 3B:
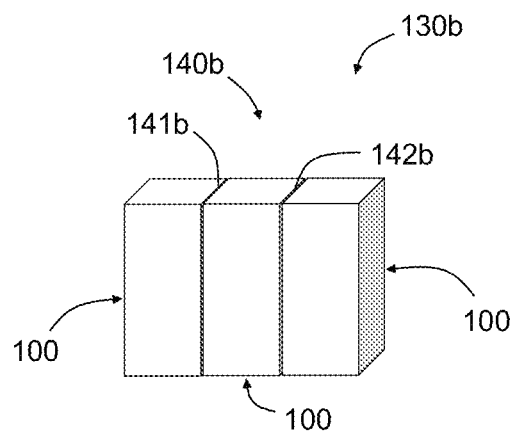
FIG. 3B is a perspective view of a hairpin wire connection according to another variation of the present disclosure.
Figure 3C:
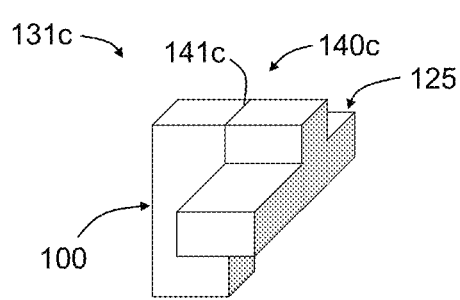
FIG. 3C is a perspective view of a hairpin wire-tab connector connection according to one variation of the present disclosure.
Figure 3D:
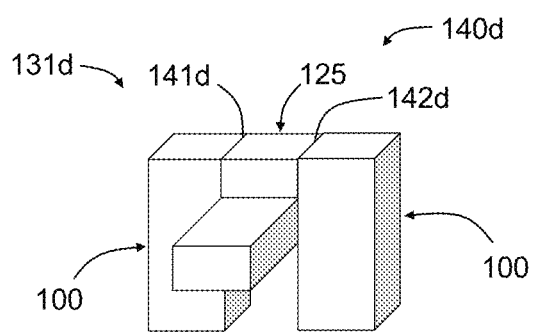
FIG. 3D is a perspective view of a hairpin wire-tab connector connection according to another variation of the present disclosure.
Figure 3E:
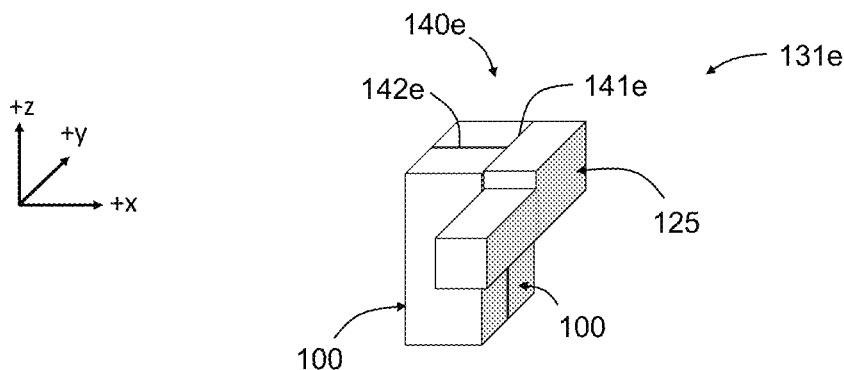
FIG. 3E is a perspective view of a hairpin wire-tab connector connection according to still another variation of the present disclosure.

Referring to FIGS. 3A-3E, examples of hairpin wire connections 130*a*-130*b* (referred to herein collectively as "hairpin wire connections 130") before being welded together are shown in FIGS. 3A-3B and examples of hairpin wire-tab connector connections 131c-131e (referred to herein collectively as "hairpin wire-tab connector connections 131") before being welded together are shown in FIGS. 3C-3E. The hairpin wire connections 130a-130b have or form weld joints 140a-140b, respectively, between hairpin wires 100 and the hairpin wire-tab connector connections 131c-131e have or form weld joints 140c-140e, respectively, between hairpin wires 100 and tab connectors 125.

Regarding hairpin wire connections 130, FIG. 3A shows the hairpin wire connection 130a with a pair of hairpin wires 100 butted against each other such that a weld joint 140a having a single joint line 141a is formed between the pair of hairpin wires 100. While the joint line 141a is shown as a linear joint line in FIG. 3A, in some variations the joint line 141a can be non-linear. Also, it should be understood that a weld electrically connecting the pair of hairpin wires 100 is generally formed along or across the joint line 141a and other joint lines discussed herein. FIG. 3B shows the hairpin wire connection 130b including three hairpin wires 100 butted against each other such that a weld joint 140b having a first joint line 141b and a second joint line 142b is formed between the three hairpin wires 100.

Regarding hairpin wire-tab connection connections 131, FIG. 3C shows the hairpin wire-tab connector connection 131c with a hairpin wire 100 and a tab connector 125 butted against each other such that a weld joint 140c with a single joint line 141c is formed between the hairpin wire 100 and the tab connector 125. FIG. 3D shows the hairpin wire-tab connector connection 131d with a tab connector 125 between a pair of hairpin wires 100 such that weld joint 140d with a first joint line 141d and a second joint line 142d is formed between with the pair of hairpin wires 100 and the tab connector 125. And FIG. 3E shows the hairpin wire-tab connector connection 131e with a pair of hairpin wires 100 butted about against a tab connector such that weld joint 140e with a first joint line 141e is formed between the pair of hairpin wires 100 and the tab connector 125 and a second joint line 142e is formed between the pair of hairpin wires 100.

Referring now to FIGS. 4A-4G, examples of mismatch between hairpin wires 100 that form hairpin wire connections 130 are shown in FIGS. 4A-4B and 4D-4G, and an example of mismatch between a hairpin wire 100 and a tab connector 125 that forms a hairpin wire-tab connector connection 131 is shown in FIG. 4C. It should be understood that the mismatch examples described below with respect to FIGS. 4A-4B and 4D-4G occur and apply to hairpin wire-tab connector connections 131 and the mismatch example described below with respect to FIG. 4C can occur and apply to hairpin wire connections 130.

As used herein the term "mismatch" refers to a physical, geometrical or chemical difference between a joining surface or edge of a hairpin wire 100 and a joining surface or edge of another hairpin wire 100 forming a hairpin wire connection 130 or a joining surface or edge of a hairpin wire 100 and a joining surface or edge of a tab connector 125 forming a hairpin wire-tab connector connection 131.

FIG. 4A shows a hairpin wire connection 130a with a physical mismatch resulting from a difference in reflectivity between upper surfaces 111 (+z direction) of the hairpin wires 100 butted against each other and forming the hairpin wire connection 130a. FIG. 4B shows another hairpin wire connection 130a with a geometric mismatch resulting from an uneven (z direction) upper surface 111 on one of the hairpin wires 100 and FIG. 4C shows a chemical mismatch resulting from a coating 127 (e.g., a thin metallic coating) on a tab connector 125 of a hairpin wire-tab connector connection 131c. FIG. 4D shows a geometric mismatch resulting from a vertical difference '$\Delta z$' between upper surfaces 111 of the hairpin wires 100 forming yet another hairpin wire connection 130a, FIG. 4E shows a geometric mismatch resulting from a lateral shift '$\Delta y$' between upper surfaces 111 of the hairpin wires 100 forming still yet another hairpin wire connection 130a, and FIG. 4F shows another geometric mismatch resulting from a gap '$\Delta x$' between upper surfaces 111 of the hairpin wires 100 forming another hairpin wire connection 130a. And FIG. 4G shows still another geometric mismatch resulting from an angular misalignment '$\Delta \theta$' between a pair of hairpin wires 100. Accordingly, different types of mismatches can be present between hairpin wires 100 forming hairpin wire connections 130, and between hairpin wires 100 and tab connectors 125 forming hairpin wire-tab connector connections 131. Other non-limiting examples of mismatch include geometric variation in hairpin wire 100 and/or tab connector 125 components, surface contamination from hydrocarbon or surface oxidation sources, and variation in removal of the enamel coating 103 from the ends 102 of the hairpin wires 100, among others.

Figure 5:
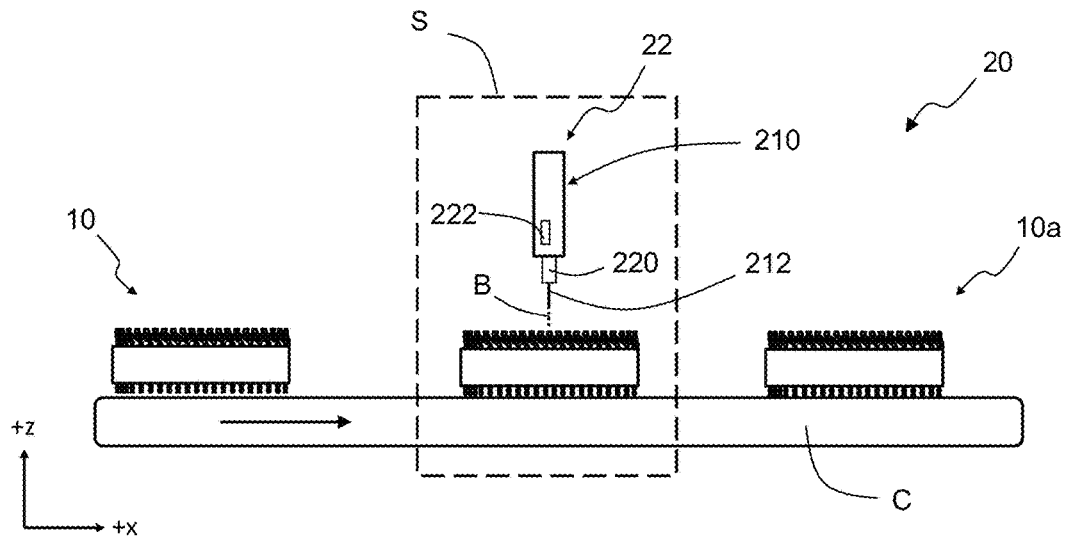
FIG. 5 is a side view of an assembly line with a laser welding system according to the teachings of the present disclosure.

Given the various types of weld joints and mismatches present between hairpin wire connections 130 and hairpin wire-tab connector connections 131, it should be understood that welding of hairpin wire connections 130 and hairpin wire-tab connector connections 131 in a cost and time efficient manner is a complex manufacturing process. Accordingly, and with reference to FIG. 5, a laser welding system 22 configured to account for the various types of weld joints and compensate for the mismatches noted above, and others, is shown. In some variations, an assembly line 20 includes a conveyor 'C' that transports stators 10 with a plurality of hairpin wire connections 130 and/or one or more hairpin wire-tab connector connections 131 (not yet welded together) through a laser welding station 'S' where the laser welding system 22 is located.

The laser welding system 22 includes a laser source 210 with a fiber 212 and an electronic vision system 220. One non-limiting example of the laser source 210 is a 6 kW Trumpf TruDisk laser (1035 nm) with a Trumpf PFO-33 optic and one non-limiting example of the fiber 212 is a Trumpf Brightline 50/200 um core ring fiber. Non-limiting examples of the electronic vision system 220 include a digital camera, a scanning optical coherence tomography system, and a laser scanning system. In some variations the electronic vision system 220 includes a controller 222 for analysis of acquired images. In the alternative, or in addition to, the electronic vision system 220 uses an external controller (not shown) for analysis of acquired images.

The laser welding system 22 welds hairpin wire connections 130 and hairpin wire-tab connector connections 131 together to form a stator 10a with a continuous electrical path through the stator winding 120. In at least one variation the hairpin wire connections 130 and the hairpin wire-tab connector connections 131 are clamped together prior to welding. And in some variations of the present disclosure, the laser welding system 22 executes specific weld path shapes implemented by a multi-step welding process to create a robust joint between two or more substrates while inhibiting spatter generation and heat damage to the enamel coating, stator assembly or tooling, as well as mitigating manufacturing noise sources, as described below. For example, in some variations the multi-step process is a two-step process, while in other variations the multi-step process includes more than two steps.

Figures 6A, 6B, 6C:
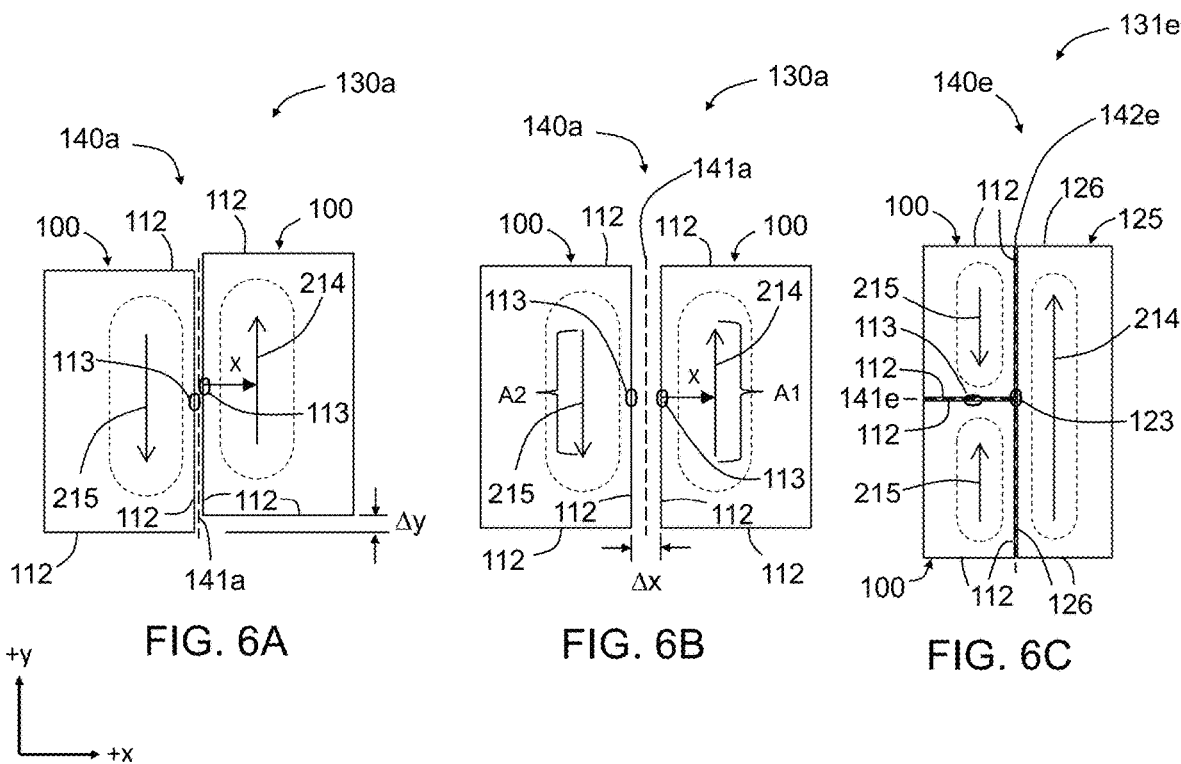
FIG. 6A is a top view of a hairpin wire connection being joined together with a first welding step according to one variation of the present disclosure.
FIG. 6B is a top view of a hairpin wire connection being joined together with a first welding step according to another variation of the present disclosure.
FIG. 6C is a top view of a hairpin wire-tab connector connection being joined together with a first welding step according to still another variation of the present disclosure.

Referring to FIGS. 6A-6C, pre-weld evaluations and first welding steps for joining a hairpin wire connection 130a with a lateral offset mismatch (FIG. 6A), a hairpin wire connection 130a with a gap mismatch (FIG. 6B), and a hairpin wire-tab connector connection 131e (FIG. 6C) are shown. Particularly, and with reference to FIG. 6A, the electronic vision system 220 acquires an image of the weld joint 140a and/or the hairpin wires 100 and the controller 222 analyzes the image and determines at least one of edges 112 of the hairpin wires 100, a center point 113 of each edge 112, and the mismatch Δy between the hairpin wires 100. With reference to FIG. 6B, the electronic vision system 220 acquires an image of the weld joint 140a and/or the hairpin wires 100 and the controller 222 analyzes the image and determines at least one of edges 112 of the hairpin wires 100, a center point 113 of each edge 112, and the mismatch Δx between the hairpin wires 100. And with reference to FIG. 6C, the electronic vision system, 220 acquires an image of the weld joint 140e and/or the hairpin wires 100 and tab connector 125, and the controller 222 analyzes the image and determines at least one of edges 112, 126, center points 113, 123 of each edge 112, 126, respectively, and any mismatch (none shown) between the hairpin wires 100 and/or between the hairpin wires 100 and the tab connector 125. Accordingly, prior to welding a hairpin wire connection 130 or a hairpin wire-tab connector connection 131, the electronic vision system 220 and the controller 222 identify the location, size, part-to-part placement of hairpin wires 100 relative to each other and/or relative to a tab connector 125, and any mismatch between the hairpin wires 100 and/or the tab connector 125.

After the image of the weld joint 140a and/or the weld joint 140e are analyzed, the controller 222 determines (e.g., calculates) a weld path, a weld joint length, at least one mismatch parameter, and/or one or more weld section origin point(s), and rotation value(s) (collectively referred to herein as "weld input parameters") of the weld joint 140a and/or weld joint 140e. It should be understood that the weld path can include which edges 112 of a hairpin wire-connector pair 130 are to be welded together. In some variations the weld path includes welding a single pair of edges 112 together (e.g., FIGS. 6A-6B), while in other variations the weld path includes welding two pair of edges 112, 126 together (FIG. 6C), and in at least one variation the weld path includes welding more than two pair of edges together (not shown). Also, non-limiting examples of the at least one mismatch parameter include a reflectivity difference value between upper surfaces of hairpin wires 100 and/or tab connectors 125, a metallic coating detection value, at least one geometric Δx, Δy, and/or Δz value, a geometric Δθ value, and hairpin wire size mismatch, among others. Also, it should be understood that the mismatch parameter can be 'zero' when no mismatch is detected (e.g., FIG. 6C).

The weld input parameters are transmitted to the laser welding system 22, and in response thereto, the laser welding system 22 directs the fiber 212 (and a laser beam B) along a laser pattern comprising multiple shaped laser weld segments. For example, and with reference to FIGS. 6A-6B, the laser welding system 22 executes a first welding step, based on the weld input parameters, that includes welding on both sides (+x direction and −x direction) of, but not overlapping, the joint lines 141a of the weld joints 140a. In some variations, the laser beam B does not overlap the joint lines 141a of the weld joints 140a and also does not overlap or cross the edges 112 of the hairpin wires 100 while forming a weld segment on a given hairpin wire 100. And in at least one variation of the present disclosure, the laser welding system 22 executes a first weld segment 214 on one side (+x direction) of, but not overlapping, the joint lines 141a and a second weld segment 215 on an opposite side (−x direction) of, but not overlapping, the joint lines 141a.

Referring particularly to FIG. 6C, the laser welding system 22 executes a first welding step based on the weld input parameters that includes welding on both sides (+y direction and −y direction) of, but not overlapping, a joint line 141e of the weld joint 140e and welding on both sides (+x direction and −x direction) of, but not overlapping, a joint line 142e of the weld joint 140e. In at least one variation of the present disclosure, the laser welding system 22 executes a first weld segment 214 on one side (+x direction) of, but not overlapping, the joint line 142e and a pair of second weld segments 215 on an opposite side of, but not overlapping, the joint line 141e and the joint line 142e.

It should be understood that the dashed ellipses in FIGS. 6A-6C represent an edge of a laser beam B (FIG. 5) propagating from the fiber 212 to the hairpin wires 100, and the solid arrows shown for the first and second weld segments 214, 215 represent a path traversed by a center of the laser beam B.

In some variations, the laser welding system 22 executes a single pass (i.e., a single laser beam pass) to form the first weld segment 214 and/or the second weld segment 215, while in other variations the laser welding system 22 executes more than one pass (e.g., rapid repetition) to form the first weld segment 214 and/or the second weld segment 215. That is, depending on the type and degree (magnitude) of mismatch between the hairpin wires 100 and/or the tab connector 125, multiple laser beam passes can be executed to reduce the degree of mismatch. For example, the laser welding system 22 can execute two passes to form the first weld segment 214 and two passes to form the second weld segment 215 for the weld joint 140a shown in FIG. 6A, while the gap Δx between the hairpin wires 100 shown in FIG. 6B may result in executing four passes to form the first weld segment 214 and four passes to form the second weld segment 215 for the weld joint 140a in FIG. 6B. In addition, a length 'A1' of the first weld segment 214, a length 'A2' of the second weld segment 215, and lengths of other weld segments discussed herein, can be predefined for a given type of hairpin wire-connector and/or determined as a function of the weld input parameters, process parameters, and equipment tolerances, size of a given/particular hairpin wire being welded, among others.

Figure 7:
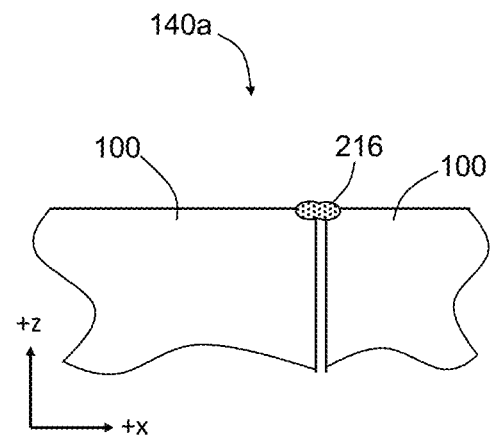
FIG. 7 is a side view of a weld formed by the first welding step in FIG. 6A.

Although the first weld segment 214 and the second weld segment 215 are biased towards, but do not overlap, the joint lines 141a, 141e, 142e between the hairpin wires 100 and/or the tab connector 125, in some variations of the present disclosure molten material from one or both sides of the joint lines 141a, 141e, 142e (i.e., from the hairpin wires 100 and/or the tab connector 125) overlaps the joint lines 141a, 141e, 142e and forms a first weld 216 as shown in FIG. 7 for the weld joint 140a. That is, it should be understood that a weld segment can have a molten pool that is larger than the diameter of the laser beam forming the weld segment. Accordingly, the first welding step forms a weld across the weld joints 140a, 140e without the laser beam B propagating between the hairpin wires 100 and between the hairpin wires 100 and the tab connector 125. Also, in some variations, the laser welding system 22 executes a single pass (i.e., a single laser beam pass) to form the first weld 216, while in other variations the laser welding system 22 executes more than one pass (e.g., rapid repetition) to form the first weld 216.

It should be understood that forming the first weld 216 using the first welding step reduces thermal damage, undesired burning of the enamel coating 103 (FIG. 1), weld spatter and/or weld contamination. In addition, the first welding step creates a smooth uniform surface to be welded on during a second welding step described below, but does not generate significant weld volume. It should also be understood that the melt generated by the linear segments 214, 215 removes or reduces variation due to inconsistent surface reflectivity, surface profile, or surface contamination and melts or removes thin coatings (e.g. a tin coating) and/or contaminants such as hydrocarbon deposits, and surface oxidation, among others, that may be present on the hairpin wires 100 and/or tab connectors 125.

Figures 8A, 8B:
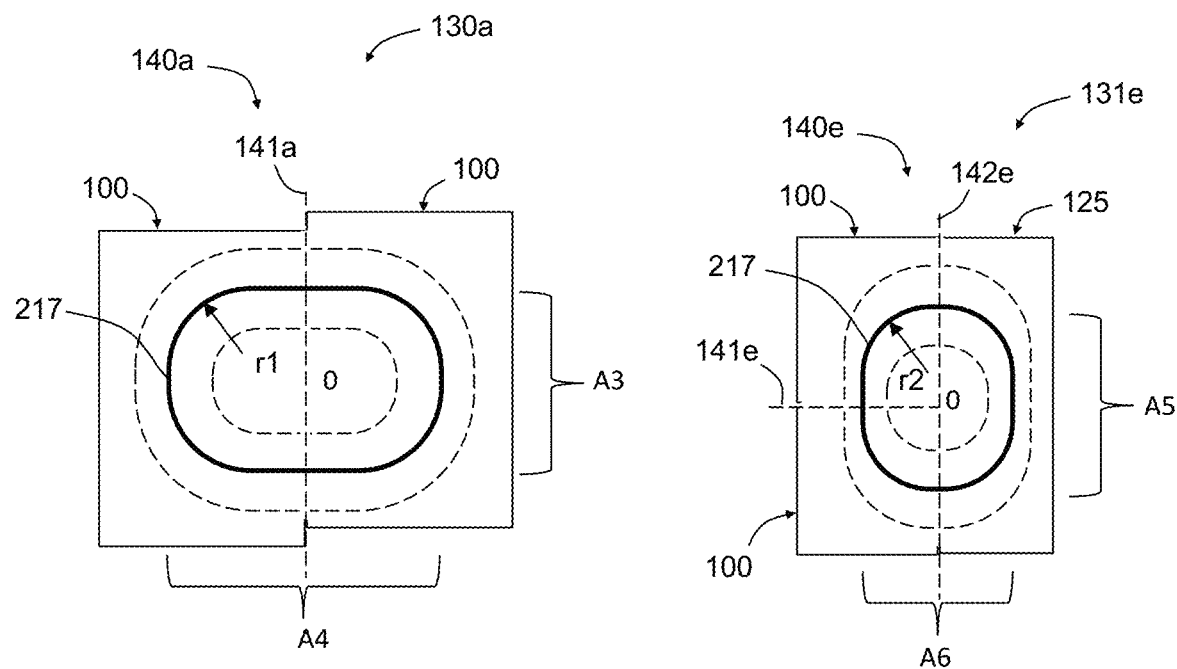
FIG. 8A is a top view of the hairpin wire connection in FIG. 6A being welded during a second welding step according to the teachings of the present disclosure.
FIG. 8B is a top view of the hairpin wire-tab connector connection in FIG. 6C being welded during a second welding step according to the teachings of the present disclosure.
Figure 9:
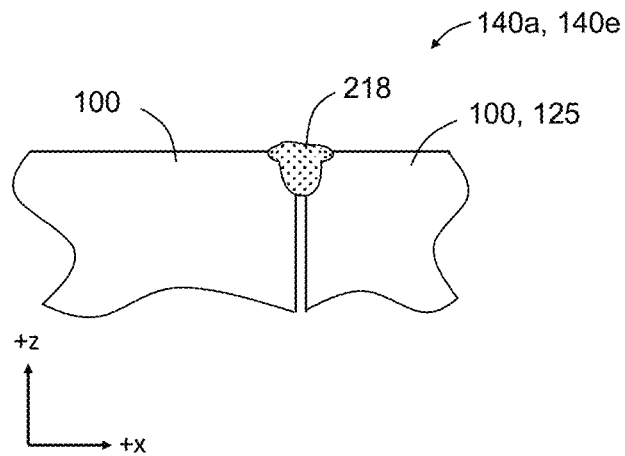
FIG. 9 is a side view of a weld formed by the second welding step in FIG. 8A.

Referring now to FIGS. 8A-8B, the laser welding system 22 executes a second welding step over the joint line 141a shown in FIG. 6A and the joint lines 141e, 142e shown in FIG. 6C such that an increase in melt volume and penetration depth of the first weld 216 results in a final weld 218 (FIG. 9) between the hairpin wires 100 (FIG. 8A) and between the hairpin wires 100 and the tab connector 125 (FIG. 8B). Particularly, the laser welding system 22 executes a second weld segment 217 over the joint line 141a (FIG. 8A) and over the joint lines 141e, 142e (FIG. 8B). In at least one variation the laser welding system 22 executes a circular or elliptical weld segment 217 over the joint line 141a as depicted in FIG. 8A and over the joint lines 141e, 142e as depicted in FIG. 8B. In some variations, the energy input, beam profile, welding speed, circular/elliptical pattern shape, placement and/or number of repetitions are a function of the weld joint 140a, 140e configuration and/or at least one mismatch parameter determined by the electronic vision system 220. For example, the lengths "A3", "A4" and radius "r1" for the second weld segment 217 in FIG. 8A, and the lengths "A5", "A6" and radius "r2" for the second weld segment 217 in FIG. 8B can be predefined for a given type of weld joint, at least one mismatch parameter, and/or determined as a function of the weld input parameters, process parameters, and equipment tolerances, among others.

In some variations the segment lengths A1-A6 and radii r1, r2 shown in FIGS. 6A-6C and 8A-8B are a function of a measured hairpin wire or tab connector dimension (WD), laser beam diameter (BD), and a vision tolerance (VT) of the electronic vision system 220. For example, and assuming the hairpin wire connection 130a in FIG. 8A 100 has an x-direction dimension of 3.6 millimeters (mm) and y-direction dimension of 3.0 mm, the diameter of the laser beam B is 680 micrometers (μm), and the vision tolerance of the electronic vision system 220 is 50 μm, a segment length A3 can be calculated as WD−BD−2VT=3.0 mm−680 um−100 um=2.22 mm. And a segment length A4 can be calculated as 3.6 mm−680 um−100 um=2.82 mm. Also, the radius of curvature r1 can be held constant, e.g., r1=0.25 mm.

In addition, the number of passes of the first weld segment and/or the second weld segment can depend or be a function of the weld area for a hairpin wire connection 130 or a hairpin wire-tab connector connection 131. For example, for an original cross-sectional area (x-y plane) of the hairpin wire 100 being 6 mm$^2$ and a desired 6 mm$^2$ weld cross-sectional area (e.g., y-z plane in FIG. 8A) five weld passes can be used to create a weld with at least 6 mm$^2$ cross-sectional area. In the alternative, for a hairpin wire 100 having a weld area of 3 mm$^2$, two weld passes can be used to create a weld with at least 3 mm$^2$ cross-sectional area. It should be understood that a weld cross-sectional area is measured along one or more planes between hairpin wires 100 and/or between hairpin wire 100 and tab connector 125.

It should be understood that a range of weld travel speeds can be used to form the first weld segments and the second weld segments. In some variations the weld travel speed is between 100 mm/s and 500 mm/s, for example, between 150 mm/s and 450 mm/s, between 200 mm/s and 400 mm/s, among others. Also, the power level of the laser beam B, travel speed, and beam profile can be varied during welding to improve beam coupling, mitigate spatter generation, control weld growth rate and, optimize cycle time.

Figure 10:
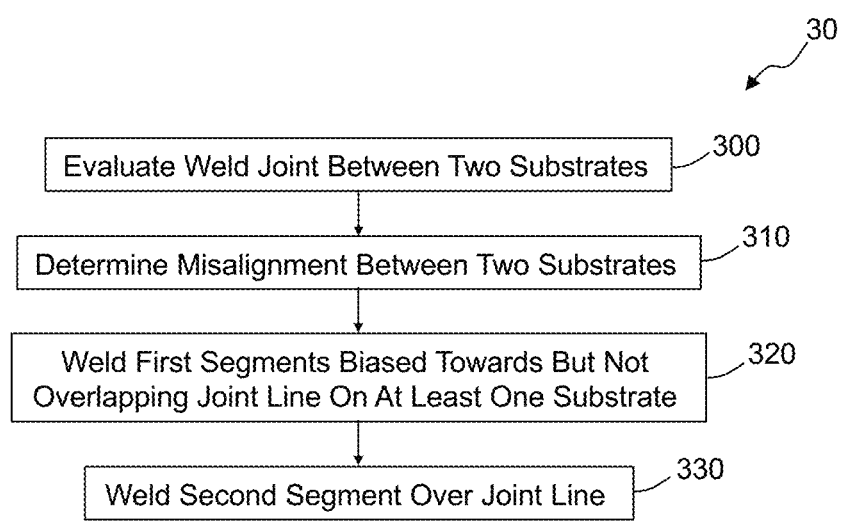
FIG. 10 is a flow chart for a method according to the teachings of the present disclosure.

Referring now to FIG. 10, a method 30 of joining electrical connections together is shown. The method 30 includes evaluating a weld joint between two substrate at 300, determining any mismatch between the two substrates at 310, and welding first weld segments biased towards but not overlapping a joint line between the two substrates with a first welding step at 320. The method also includes welding a second weld segment over the joint line between the two substrates with a second welding step at 330. In this manner, a continuous electrical path through the stator winding 120 is provided with each hairpin wire pair connected with a weld that has low electrical resistivity, desired static strength, resistance to fatigue stresses (both vibrational and thermal) and consistent, low discontinuity metallurgical properties. In addition, joining of the hairpin wire connections 130 and hairpin wire-tab connector connections 131 according to the teachings of the present disclosure inhibits or prevents enamel and tooling damage from laser light passing through the joint line during the welding process, mitigates spatter and stray copper debris, and creates a uniform weld shape which does not contact other electrical connections or provide a place for electricity to arc between isolated windings.

It should be understood that using a continuous circular or elliptical laser beam pass tracing joint lines results in maintaining keyhole stability while enhancing outgassing of absorbed gasses, voids or porosity from the molten pool. And a rapid growth phase of the weld reduces the amount of cycle time as compared to the cycle time needed for the same weld volume using only linear segments. Due to the instability of welding copper, the oscillatory shape of the path allows for achieving adequate beam speed, maintaining stability in deep penetration welding, and rapid growth of the weld pool minimizes total energy input and resultant thermal impact to a hairpin wire and tab connector. In some variations the second welding step is implemented immediately after the first weld, while in other variations the second welding step is implemented after an extended time period. It should be understood that the number of passes during the second welding step may vary depending on when the second step is implemented. In addition, in some variations a third welding step is implemented to ensure weld quality.

Further areas of applicability will become apparent from the description provided herein. It should be understood that the description and specific examples are intended for purposes of illustration only and are not intended to limit the scope of the present disclosure.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below.

In this application, the terms "module", "control system", and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of joining electrical connections together, the method comprising:
    evaluating at least one weld joint between at least two substrates;
    determining mismatch between the at least two substrates; and
    welding the at least two substrates together with a multi-step welding process comprising compensating for the mismatch between the at least two substrates by melting on both sides but not overlapping a joint line between the at least two substrates with a first welding step and increasing melt volume and penetration depth of a weld between the at least two substrates with a second welding step,
    wherein the at least two substrates comprise a plurality of hairpin wires and welding the at least two substrates together comprises welding a plurality of welding hairpin wire connections together by executing the first welding step and the second welding step on each of the plurality of hairpin wire connections.

2. The method according to claim 1, wherein evaluating the at least one weld joint comprises identifying edges and center points of the at least two substrates, and at least one of angular misalignment between the at least two substrates, a gap between the at least two substrates, a vertical offset between the at least two substrates, a lateral offset between the at least two substrates, a difference in reflectivity between the at least two substrates, a difference in geometric shape between the at least two substrates, a difference in chemistry between the at least two substrates.

3. The method according to claim 1, wherein the first welding step comprises melting linear weld segments biased towards but not overlapping the joint line between the at least two substrates and the second welding step comprises circular or elliptical welding over the joint line between the at least two substrates.

4. The method according to claim 1, wherein the at least two substrates comprise two rectangular hairpin wires butted together.

5. The method according to claim 1, wherein the at least two substrates comprise three rectangular hairpin wires butted together.

6. The method according to claim 1, wherein the at least two substrates comprise a hairpin wire butted against a tab connector.

7. The method according to claim 1, wherein the at least two substrates comprise a tab connector butted between two hairpin wires.

8. The method according to claim 1, wherein the at least two substrates comprise two hairpin wires butted against a tab connector.

9. The method according to claim 1, wherein the at least two substrates are vertically misaligned from each other and the first welding step reduces the vertical mismatch before the second welding step.

10. The method according to claim 1 further comprising assembling an electric motor stator via welding the plurality of welding hairpin wire connections together.

11. The method according to claim 10, wherein the plurality of hairpin wire connections are laser welded together with a weld travel speed between 100 mm/s and 500 mm/s.

12. The method according to claim 10, wherein the plurality of hairpin wire connections is evaluated with an electronic vision system.

13. The method according to claim 12, wherein the electronic vision system identifies at least one of a position of each of the plurality of hairpin wire connections, a size of each hairpin wire forming each of the plurality of hairpin wire connections, one or more edges of each hairpin wire forming each of the plurality of hairpin wire connections, an angular misalignment between each hairpin wire forming each of the plurality of hairpin wire connections, a gap between each hairpin wire forming each of the plurality of hairpin wire connections, a vertical offset between each hairpin wire forming each of the plurality of hairpin wire connections, a lateral offset between each hairpin wire forming each of the plurality of hairpin wire connections, a difference in reflectivity between each hairpin wire forming each of the plurality of hairpin wire connections, a difference in geometric shape between each hairpin wire forming each of the plurality of hairpin wire connections, and a difference in chemistry between each hairpin wire forming each of the plurality of hairpin wire connections.

14. The method according to claim 13, wherein the electronic vision system is co-axial to a laser beam welding the at least two substrates together.

15. A method of joining electrical wiring together, the method comprising:
- evaluating a weld joint between at least two hairpin wires;
- determining mismatch between the at least two hairpin wires;
- melting at least two weld segments biased towards but not overlapping a joint line between the at least two hairpin wires during a first welding step; and
- circular or elliptical welding over the joint line between the at least two hairpin wires during a second welding step.

16. The method according to claim 15, wherein the weld joint is evaluated with an electronic vision system and the evaluating comprises identifying edges and center points of the at least two hairpin wires, and at least one of an angular misalignment between the at least two hairpin wires, a gap between the at least two hairpin wires, a vertical offset between the at least two hairpin wires, a lateral offset between the at least two hairpin wires, a difference in reflectivity between the at least two hairpin wires, a difference in geometric shape between the at least two hairpin wires, and a difference in chemistry between the at least two hairpin wires.

17. The method according to claim 16 further comprising assembling an electric motor stator via welding the ends of a plurality of hairpin wires together with the first welding step and the second welding step.

18. A method of joining electric motor stator wiring, the method comprising:
- evaluating weld joints between hairpin wire connections of a stator winding with an electronic vision system;
- determining mismatch between each of the hairpin wire connections with the electronic vision system and transmitting at least one mismatch parameter to a laser welding system for each of the hairpin wire connections;
- laser welding linear weld segments biased towards but not overlapping a joint line between each of the hairpin wire connections by melting the linear weld segments during a first welding step and forming a weld across the joint line as a function of the at least one mismatch parameter; and
- oscillatory welding over the joint line between each of the hairpin wire connections during a second welding step.

19. The method according to claim 18 further comprising assembling an electric motor stator via welding each of the hairpin wire connections together with the first welding step and the second welding step.

* * * * *